Aug. 19, 1958 J. R. McCORDIC ET AL 2,847,874
TRANSMISSION CONTROL MECHANISM
Filed Aug. 28, 1956 3 Sheets-Sheet 2

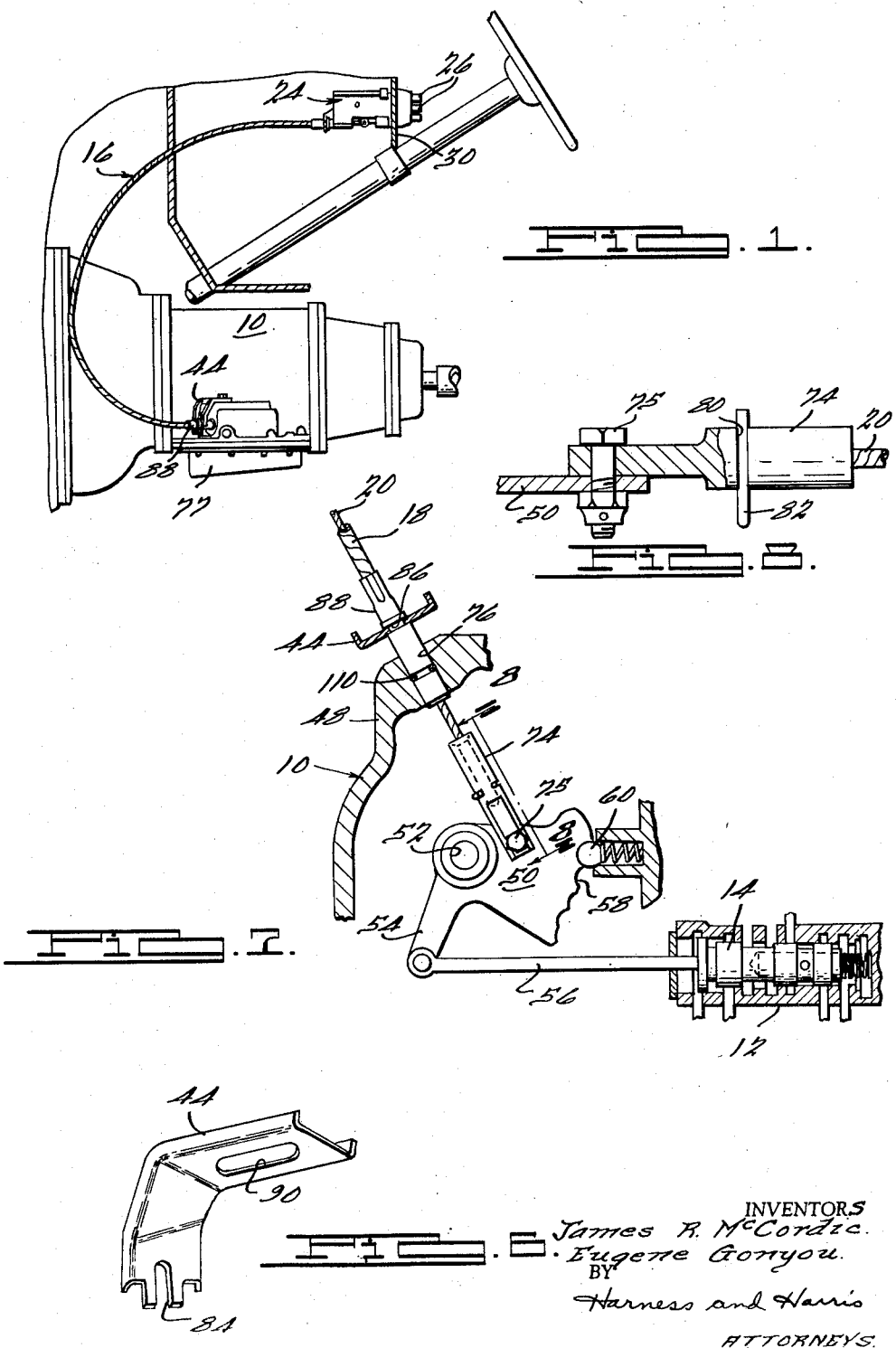

INVENTORS
James R. McCordic
Eugene Gonyou.
BY
Harness and Harris
ATTORNEYS

Aug. 19, 1958 J. R. McCORDIC ET AL 2,847,874
TRANSMISSION CONTROL MECHANISM
Filed Aug. 28, 1956 3 Sheets-Sheet 3
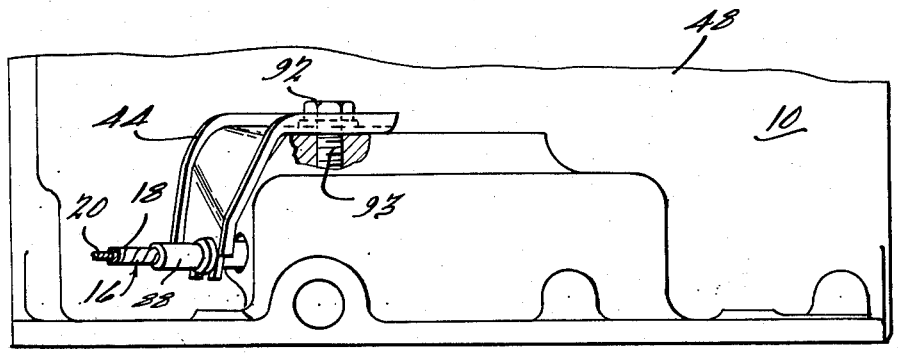
INVENTORS.
James R. McCordic
Eugene Gonyou.
BY
Harness and Harris
ATTORNEYS.

United States Patent Office 2,847,874
Patented Aug. 19, 1958

2,847,874

TRANSMISSION CONTROL MECHANISM

James R. McCordic, Royal Oak, and Eugene Gonyou, Detroit, Mich., assignors to Chrysler Corporation, Highland Park, Mich., a corporation of Delaware Application August 28, 1956, Serial No. 606,765

8 Claims. (Cl. 74—502)

This invention relates to a transmission control mechanism and more particularly to an adjustable mounting for a transmission control cable.

The copending application, Serial No. 530,528 filed August 25, 1955, by Alan G. Loofbourrow and James R. McCordic discloses a push button control for an automatic transmission in which a plurality of selectively operable elements, such as push buttons, may be manually actuated to position a transmission control valve in a plurality of stations by means of a single cable forming an operative connection therebetween. The invention hereindescribed constitutes an improvement on the device disclosed in the aforementioned copending application.

It is desirable in the commercial production of automobiles or other devices incorporating the control apparatus of the type to be described herein to provide preformed fittings on the ends of the control cable and cooperating fittings on a first part associated with the aforementioned selectively operable elements and on a second part associated with the transmisison control valve. The above mentioned preformed fittings impart a predetermined length to the cable and in themselves are desirable because they facilitate rapid assembly, but they have a disadvantage in that they provide no means to compensate for variations in the distance between the above mentioned first and second parts which occurs in different commercially produced devices. Although the distance between the above mentioned first and second parts may vary slightly in different installations their relative positions must not vary for they determine the positions of the transmission control valve.

It is a principal object of this invention to provide means to mount the above mentioned cable such that when the said fittings are being secured to the first and second parts the effective length of the cable may be altered to compensate for any departure from the desired distance between said first and second parts.

In the drawings:

Fig. 1 is a fragmentary side elevational view, partly in section, showing the apparatus associated with an automobile transmisison;

Fig. 5 is a fragmentary side elevational view on an enlarged scale of a portion of the transmission shown in Fig. 1;

Fig. 6 is a perspective view of a bracket;

Fig. 7 is a diagrammatic view partly in section showing the operative connection of the cable to the transmission control valve;

Fig. 8 is a sectional view taken on the line 8—8 of Fig. 7;

Fig. 9 is an exploded view of the connecting means used to fasten the cable to the transmission control mechanism;

Fig. 10 is a fragmentary sectional view showing a modified form of fastening which may be substituted for the bracket of Fig. 6;

Fig. 11 shows another modified form of fastening means; and

Fig. 12 is a sectional view taken on the line 12—12 of Fig. 11.

Figure 4:
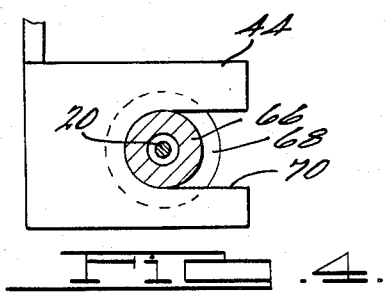
Fig. 4 is a vertical section taken on the line 4—4 of Fig. 3.

The apparatus to be described herein is adapted for use in combination with transmission control apparatus of the type illustrated and described in Jeremy T. Ball patent application Serial No. 477,870 filed December 27, 1954. The transmission described in the above mentioned Jeremy T. Ball application is representative of some commercial transmisison to the extent that a hydraulic control system for the transmission is regulated for movement of a single valve. The transmission is shown in Fig. 1 and designated by the numeral 10 and the valve referred to is designated by the numeral 12 in Fig. 7.

The valve 12 includes a slidable valve operating member 14 which may be selectively positioned at different stations respectively corresponding to different transmission operating conditions. The valve operating member 14 is operatively connected, through a mechanism to be described herein, to a cable 16. The cable 16 includes an outer sheath 18 and an inner control element 20 with the inner control element operatively connected to an output member 22 of a driver operated push button device 24.

Figure 2:
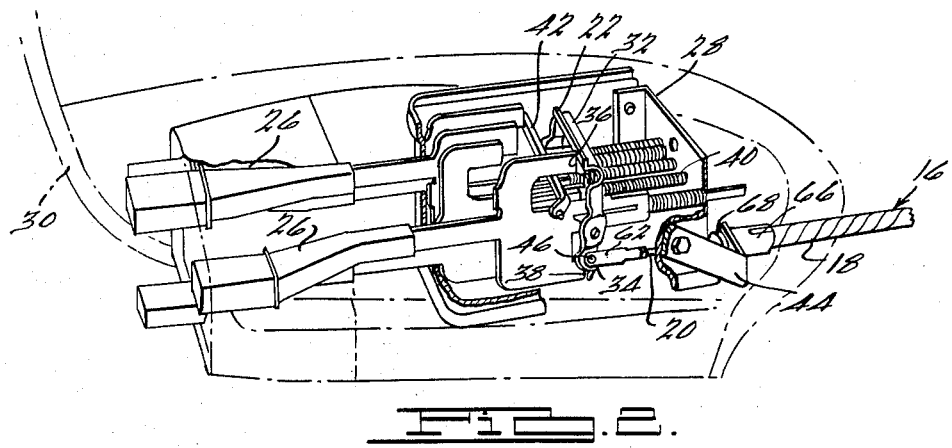
Fig. 2 is a perspective view, partly broken away, showing the manually operated push button control device.
Figure 3:
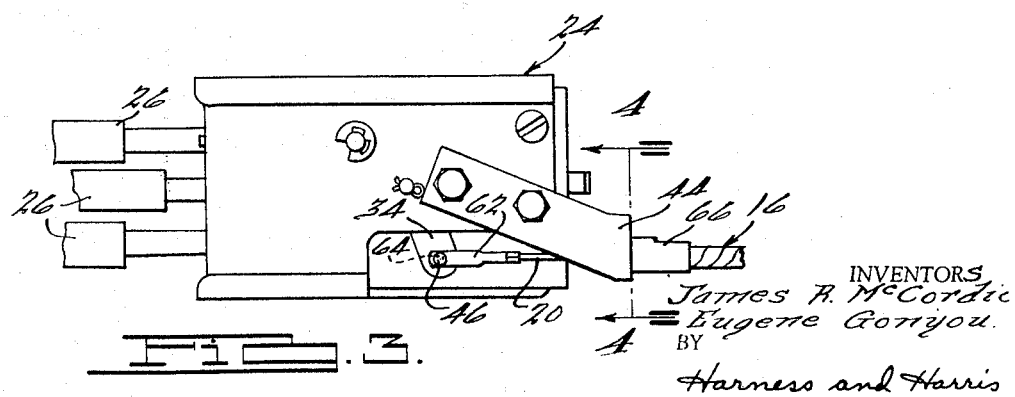
Fig. 3 is a side elevational view of the push button control of Fig. 2.

The driver operated push button device 24 is more completely described in the copending application of Alan G. Loofbourrow and James R. McCordic, Serial No. 530,528, which was filed August 25, 1955, and it includes a plurality of selectively operable push buttons 26 which are slidably mounted in a support 28 and which are adapted to position the output member 22 in a plurality of operating stations. The push button device is preferably mounted on an instrument panel 30 of the motor vehicle and referring to Fig. 2 it will be noted that, as described in the above mentioned copending application Serial No. 530,528, the output member 22 is rotatably mounted on the support 28. The output member 22 includes upper and lower transversely extending portions 32 and 34 and the push buttons 26 each carry a pair of cooperating cam surfaces 36 and 38 which are adapted to strike the upper and lower transversely extending portions 32 and 34 of the output member 22 to predetermine the angular position which the output member 22 will assume when a particular push button 26 is depressed. The cam surfaces 36 and 38 have slightly different relative spacing of the respective push buttons 26 so that no two of the push buttons 26 dictate the same angular position of the output member 22 and the spacing of the cam surfaces 36 and 38 on the push buttons is preselected so that the angular positions assumed by the output member 32 in response to selective operation of the individual push buttons causes adequate movement of the valve operating member 14 to establish a selected transmission condition. Suitable springs 40 extend between the respective push buttons 26 and the support 28 to return the push buttons and a latching device 42 is utilized to retain a depressed push button in contact with the output member 22 until subsequently released by depression of another push button as described in the above mentioned copending patent application Serial No. 530,528.

The cable 16 is preferably of the Bowden wire type and its outer sheath 18 is secured to the support 28 through a bracket 44 while its inner control element 20 is secured by a pin 46 to the output member 22. The other end of the cable 16 extends to the transmission 10 and the outer sheath 18 of the cable is fixed to the outer casing 48 of the transmission 10 while the inner control element 20 penetrates the casing 48 and extends into the interior of the transmission.

A lever plate 50 is rotatably mounted within the transmission on a vertically extending shaft 52 and is provided with a laterally extending finger 54 which in turn is connected by a link 56 to the slidable valve operating member 14. As previously mentioned herein the slidable valve operating member 14 is adapted to control the hydraulic control system of a transmission in the manner described in Jeremy T. Ball patent application, Serial No. 477,870 which was filed December 27, 1954 and reference may be made thereto for a description of the hydraulic control system and the operative components of the transmission 10.

The rotatable lever plate 50 is preferably provided with a plurality of serrations 58 which are engaged by a spring detent mechanism 60 to retain the lever plate 50 in predetermined positions corresponding to different stations of the valve operating member 14. The inner control element 20 of the cable 16 is secured to the lever plate 50, in a manner to be described herein, so that positioning of the valve operating member 14 occurs as an incident to selective depression of a push button 26 by reason of the fact that the cooperating cam surfaces 36 and 38 of the selected push button predetermine the position assumed by the output member 22 which, in turn moves the inner control element 20 of the cable 16 to a selected position relative to its outer sheath 18 and this causes rotation of the lever plate 50 and simultaneous positioning of the slidable valve operating member 14. It will be seen that the particular movements imparted to the cable inner control element 20 by selective operation of the push buttons must be coordinated with the stations which the lever plate 50 should assume, under the control of the spring detent mechanism 60, so that an exact positioning of the valve operating member 14 will occur in response to an actuation of each of the push buttons 26.

In order that expensive and time consuming trial and error adjustments will not be necessary in the assembly of each automobile including the control mechanism described herein a novel means has been provided to accommodate rapid assembly of the parts and compensation for any slight dimensional variations which might occur in different vehicles. The cable is provided with an unsupported portion of bowed configuration intermediate its ends which contributes to the installation and adjustment thereof. At one end of the cable 16 the inner control element 20 has a preformed fitting 62 permanently secured thereto and the fitting 62 is provided with an opening 64 which is adapted to be penetrated by a pin 46 to secure the cable inner control element to the output member 22. The corresponding end of the outer sheath 18 is provided with a fitting 66 which has an annular groove 68. The bracket 44 which is carried by the support 28 is slotted at 70 as indicated in Fig. 4 and the depth of the groove 68 is predetermined so that the fitting 66 may be assembled on the bracket 44 by inserting the groove 68 in the slot 70. It will thus be seen that the provision of predetermined fittings at one end of the cable accommodates rapid assembly of the cable to the push button device 24. No provision for adjustment has yet been described, however.

The inner control element 20 of the cable 16 at its lower or other end is provided with a fitting 72. The lever plate 50 carries a cooperating fitting 74 which is bolted to the lever plate 50 by bolt means 75. Fitting 74 is hollow and adapted to be aligned with an opening 76 provided in the casing 48 of the transmission 10. The transmission casing 48 carries a pan 77 which may be removed to accommodate manual alignment of fitting 74 with opening 76. The fitting 74 is adapted to be axially penetrated by the fitting 72 and the fitting 72 has an annular groove 78 while the fitting 74 has a partial annular slot 80. A spring clip 82 is snapped over the fitting 74 with a portion of the clip 82 penetrating into the interior of the hollow fitting 74 by reason of the slot 80. It will be seen that in assembly the cable 16 may be pushed through the opening 76 in the transmission casing 48 until the fitting 72 penetrates the hollow fitting 74 sufficiently for the spring 82 to snap into the groove thereby establishing an operative connection between the cable inner control element 20 and the lever plate 50.

The outer sheath 18 of the cable 16 must also be secured relative to the transmission and since each of the fittings which have heretofore been described are preformed on the cable it will be seen that a provision for adjustment is necessary in the event that the lever plate 50 might be a slightly different distance from the output member 22 in different assembled automobiles. This adjustment is obtained by reason of the fact that when the cable penetrates the transmission casing 48 and the fitting 72 is forced into the fitting 74 until it passes under the spring 82 it effectively forces the lever plate 50 and valve operating member 14 to the extreme position illustrated in Fig. 7 where the spring detent mechanism engages the last serration 58 on the lever plate 50. If the corresponding push button 26 is depressed at that time so that the output member 22 of the push button device 24 is positioned in the position corresponding to the extreme position of the lever plate 50 it will be established that the proper relative positions exist between the output member 22 and the lever plate 50. However, it is then necessary to secure the outer sheath 18 to the transmission 10 and therein the adjustment occurs for the unsupported intermediate bowed portion of the cable permits considerable latitude in positioning the fitting 72 of the cable inner control element in its proper position in fitting 74 on the lever plate 50. The bracket 44 carries a bifurcated portion 84 which is adapted to straddle a slotted portion 86 of a fitting 88 provided on the end of the outer sheath 18 of cable 16. The bracket 44 also includes a slot 90 which is adapted to receive a nut 92 which may be threaded into a threaded opening 93 provided in the casing 48 of the transmission 10. The slot 90 in bracket 44 permits fastening of the bracket to the transmission casing 48 at an adjusted position dictated by the position of the outer sheath 18 upon the completion of the fastening of the inner control element fitting 72 in its proper position in the fitting 74. Thus any departure from the intended distance between the operating member 22 and the lever plate 50 is compensated for by adjustment of the bracket 44 and consequent change in the curvature of the bowed portion 16.

A modified form of fastening is illustrated in Fig. 10. In this device the bracket 44 is omitted and the fitting 88 penetrates the opening 76 in the transmission casing 48 as previously described. A set screw 100 is used to secure the fitting 88 in its adjusted position in the transmission casing 48. This accomplishes an adjustment corresponding to that provided by the slot 90 of the bracket 44 in the Fig. 5 form of the invention.

In Fig. 11 a further modified form of the invention is illustrated in that instead of using the slotted bracket 44 or the set screw 100, as previously described, a sleeve 102 is threaded into the transmission casing 48 to form the opening 76 therein. The sleeve 102 is provided with a portion 104 that has several axial slits 106 therein and external pipe threads thereon. A threaded member 108 is threaded on the pipe threads to compress the sleeve radially upon the fitting 88 to effect an adjustable securement of the fitting 88 to the transmission casing 48.

In each of the three forms of the invention which have been described above an O ring seal 110 has been illustrated as circumscribing a groove 112 provided on the fitting 88. The seal is desirable to prevent the escape of lubricant from the interior of the transmission.

We claim:

1. In a transmission control mechanism a driver operated device including a support, an output member movably mounted on said support, a manually operable control means carried by said support and operable to position said output member in a plurality of operating stations, a transmission control mechanism carried by a second support and having a member movable to a plurality of stations respectively corresponding to different transmission operating conditions, a cable structure operatively connecting said output member and said transmission control mechanism to position said movable member in a different predetermined station in response to the establishment of said output member in each of its operating stations, said cable structure having an unsupported portion of bowed configuration intermediate its ends and comprising an outer sheath with an inner control element slidably mounted therein, said inner control element having fittings at the respective ends thereof defining a predetermined, permanent, effective length for said inner control element, first and second cooperating fitting means respectively carried by said members, each of said cooperating fitting means being permanently secured in a predetermined relationship with a corresponding fitting on one end of said inner control element, means securing one end of said outer sheath to one of said supports, and means providing an adjustable connection between the other end portion of said outer sheath and the other of said supports whereby adjustment of said connection, which is facilitated by variation in the bowed configuration of said fittings and cable, accomodates the alignment of said cooperating fitting means without varying the relationship between said cable inner control element and said cable outer sheath.

2. In a transmission control mechanism a driver operated device including a support, an output member movably mounted on said support, a manually operable control means carried by said support and operable to position said output member in a plurality of operating stations, a transmission control mechanism carried by a second support and having a member movable to a plurality of stations respectively corresponding to different transmission operating conditions, a cable structure operatively connecting said output member and said transmission control mechanism to position said movable member in a different predetermined station in response to the establishment of said output member in each of its operating stations, said cable structure having an unsupported portion of bowed configuration intermediate its ends and comprising an outer sheath with an inner control element slidably mounted therein, said inner control element having fittings at the respective ends thereof defining a predetermined, permanent, effective length for said inner control element, first and second cooperating fitting means respectively carried by said members, each of said cooperating fitting means being permanently secured in a predetermined relationship with a corresponding fitting on one end of said inner control element, means securing one end of said outer sheath to one of said supports, and means providing an adjustable connection between another portion of said outer sheath and said second support whereby adjustment of said connection, which is facilitated by variation in the bowed configuration of said cable, accommodates the alignment of said fittings and cooperating fittings means without varying the relationship between said cable inner control element and said cable outer sheath.

3. In a transmission control mechanism a driver operated device including a support, an output member movably mounted on said support, a plurality of push buttons which are mounted on said support and manually operable to position said output member in a plurality of operating stations, a transmission control valve mechanism carried by a second support and having a member movable to a plurality of stations respectively corresponding to different transmission operating conditions, a cable structure operatively connecting said output member and said transmission control valve mechanism to position said valve member in a different predetermined station in response to the establishment of said output member in each of its operating stations, said cable structure having an unsupported portion of bowed configuration intermediate its ends and comprising an outer sheath with an inner control element slidably mounted therein, said inner control element having fittings at the respective ends thereof defining a predetermined, permanent, effective length for said inner control element, a first cooperating fitting means carried by said output member and a second cooperating fitting means carried by said valve member, each of said cooperating fitting means being permanently secured in a predetermined relationship with a corresponding fitting on one end of said inner control element, means securing one end of said outer sheath to said first mentioned support, and means providing an adjustable connection between another portion of said outer sheath and said second support whereby adjustment of said connection, which is facilitated by variation in the bowed configuration of said cable, accommodates the alignment of said fittings and cooperating fitting means without varying the relationship between said cable inner control element and said cable outer sheath.

4. In a transmission control mechanism a driver operated device including a support, an output member movably mounted on said support, a manually operable control means carried by said support and operable to position said output member in a plurality of operating stations, a transmission control mechanism carried by a second support and having a member movable to a plurality of stations respectively corresponding to different transmission operating conditions, a cable structure operatively connecting said output member and said transmission control mechanism to position said movable member in a different predetermined station in response to the establishment of said output member in each of its operating stations, said cable structure having an unsupported portion of bowed configuration intermediate its ends and comprising an outer sheath with an inner control element slidably mounted therein, said inner control element having fittings at the respective ends thereof defining a predetermined, permanent, effective length for said inner control element, first and second cooperating fitting means respectively carried by said members, each of said cooperating fitting means being permanently secured in a predetermined relationship with a corresponding fitting in one end of said inner control element, means securing one end of said outer sheath to one of said supports, a said cable inner control element and the other of said members, a bracket carried by the other end portion of said outer sheath, and means providing an adjustable mounting of said bracket on the other of said supports whereby adjustment of said bracket, which is facilitated by variation in the bowed configuration of said cable, accommodates the alignment of said fittings and cooperating fitting means without varying the relationship between said cable inner control element and said cable outer sheath.

5. In a transmission control mechanism a driver operated device including a support, an output member movably mounted on said support, a manually operable control means carried by said support and operable to position said output member in a plurality of operating stations, a transmission control mechanism carried by a second support and having a member movable to a plurality of stations respectively corresponding to different transmission operating conditions, a cable structure operatively connecting said output member and said transmission control mechanism to position said movable member in a different predetermined station in response to the establishment of said output member in each of its operating stations, said cable structure having an unsupported portion of bowed configuration intermediate its ends and comprising an outer sheath with an inner control element slidably mounted therein, said inner control element having fittings at the respective ends thereof defining a predetermined, permanent, effective length for said inner control element, a first cooperating fitting means carried by said output member, and a second cooperating fitting means carried by said transmission control member, each of said cooperating fitting means being permanently secured in a predetermined relationship with a corresponding fitting on one end of said inner control element, means securing one end of said outer sheath to said first mentioned support, a bracket carried by the other end portion of said outer sheath, and means providing an adjustable mounting of said bracket on said second support whereby adjustment of said bracket, which is facilitated by variation in the bowed configuration of said cable, accommodates the alignment of said fittings and cooperating fitting means without varying the relationship between said cable inner control element and said cable outer sheath.

6. In a transmission control mechanism a driver operated device including a support, an output member movably mounted on said support, a manually operable control means carried by said support and operable to position said output member in a plurality of operating stations, a transmission control mechanism carried by a second support and having a member movable to a plurality of stations respectively corresponding to different transmission operating conditions, a cable structure operatively connecting said output member and said transmission control mechanism to position said movable member in a different predetermined station in response to the establishment of said output member in each of its operating stations, said cable structure having an unsupported portion of bowed configuration intermediate its ends and comprising an outer sheath with an inner control element slidably mounted therein, said inner control element having fittings at the respective ends thereof defining a predetermined, permanent, effective length for said inner control element, first and second cooperating fitting means respectively carried by said members, each of said cooperating fitting means being permanently secured in a predetermined relationship with a corresponding fitting on one end of said inner control element, means securing one end of said outer sheath to one of said supports, and set screw means carried by the other of said supports and engaging the other end portion of said outer sheath, said set screw means permitting linear adjustment of said outer sheath relative to said other support by variation in the bowed configuration of said cable to accommodate the alignment of said fittings and cooperating fitting means without varying the relationship between said cable inner control element and said cable outer sheath.

7. In a transmission control mechanism a driver operated device including a support, an output member movably mounted on said support, a manually operable control means carried by said support and operable to position said output member in a plurality of operating stations, a transmission control mechanism carried by a second support and having a member movable to a plurality of stations respectively corresponding to different transmission operating conditions, a cable structure operatively connecting said output member and said transmission mechanism to position said movable member in a different predetermined station in response to the establishment of said output member in each of its operating stations, said cable structure having an unsupported portion of bowed configuration intermediate its ends and comprising an outer sheath with an inner control element slidably mounted therein, said inner control element having fittings at the respective ends thereof defining a predetermined, permanent, effective length for said inner control element, a first cooperating fitting means carried by said output member, and a second cooperating fitting means carried by said transmission control member, each of said cooperating fitting means being permanently secured in a predetermined relationship with a corresponding fitting on one end of said inner control element, means securing one end of said outer sheath to one of said supports, and clamping and supporting means including a set screw carried by the other of said supports and engaging the other end portion of said outer sheath, said set screw permitting linear adjustment of said outer sheath relative to said other support by variation in the bowed configuration of said cable to accommodate the alignment of said fittings and cooperating fitting means without varying the relationship between said cable inner control element and said cable outer sheath.

8. In a transmission control mechanism a driver operated device including a support, an output member movably mounted on said support, a manually operable control means carried by said support and operable to position said output member in a plurality of operating stations, a transmission control mechanism carried by a second support and having a member movable to a plurality of stations respectively corresponding to different transmission operating conditions, a cable structure operatively connecting said output member and said transmission control mechanism to position said movable member in a different predetermined station in response to the establishment of said output member in each of its operating stations, said cable structure having an unsupported portion of bowed configuration intermediate its ends and comprising an outer sheath with an inner control element slidably mounted therein, said inner control element having fittings at the respective ends thereof defining a predetermined, permanent, effective length for said inner control element, a first cooperating fitting means carried by said output member, and a second cooperating fitting means carried by said transmission control member, each of said cooperating fitting means being permanently secured in a predetermined relationship with a corresponding fitting on one end of said inner control element, means securing one end of said outer sheath to one of said supports, and clamping and supporting means including adjustable friction means carried by the other of said supports and adapted to clamp the other end portion of said outer sheath, said friction means permitting linear adjustment of said outer sheath relative to said other support by variation in the bowed configuration of said cable to accommodate the alignment of said fittings and cooperating fitting means without varying the relationship between said cable inner control element and said cable outer sheath.

References Cited in the file of this patent

UNITED STATES PATENTS

| | | |
|---|---|---|
| 2,232,217 | Dijksterhuis | Feb. 18, 1941 |
| 2,307,619 | Brewer | Jan. 5, 1943 |

UNITED STATES PATENT OFFICE
CERTIFICATE OF CORRECTION

Patent No. 2,847,874      August 19, 1958

James R. McCordic et al.

It is hereby certified that error appears in the printed specification of the above numbered patent requiring correction and that the said Letters Patent should read as corrected below.

Column 1, line 41, for "occurs" read -- occur --; line 56, for "transmisison" read -- transmission --; column 2, line 17, for "transmisison" read -- transmissions --; line 54, for "of" read -- on --; column 5, line 31, strike out "fittings and" and insert the same after "said" in line 32, same column; column 6, line 52, for "in" read -- on --; lines 54 and 55, strike out "a said cable inner control element and the other of said members,"; column 7, line 68, after "transmission" insert -- control --.

Signed and sealed this 2nd day of December 1958.

(SEAL)
Attest:

KARL H. AXLINE
Attesting Officer

ROBERT C. WATSON
Commissioner of Patents